Sept. 9, 1969  BERND-HEINZ HELLE  3,465,529
DOUBLE-ENDED SOCKET COUPLING FOR STONEWARE PIPES
Filed May 31, 1967  2 Sheets-Sheet 1
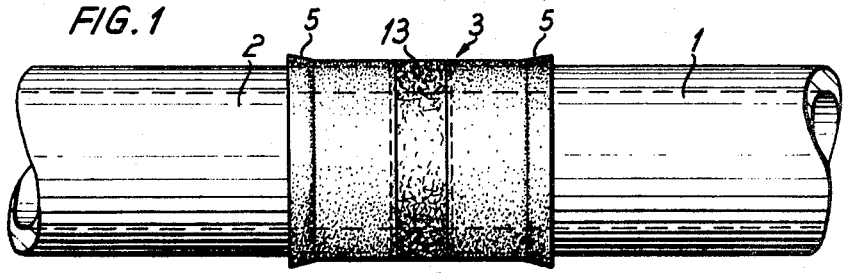
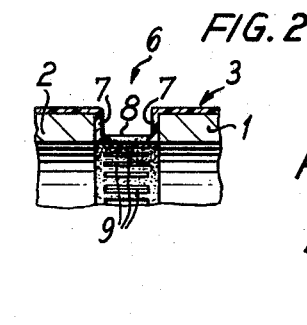
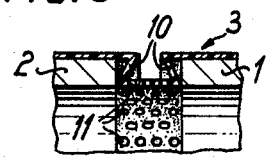
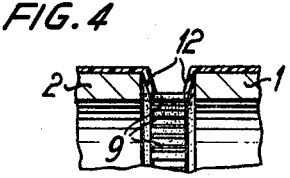
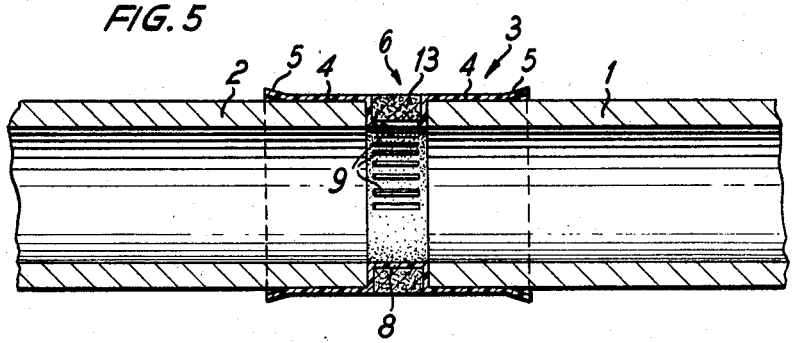
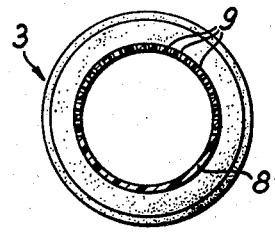
INVENTOR
BERND-HEINZ HELLE
By [signature]

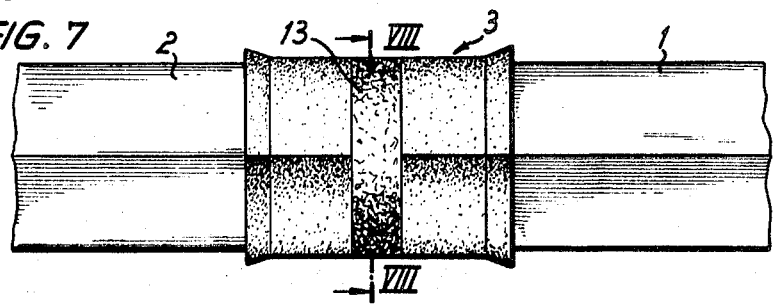
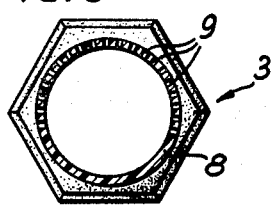
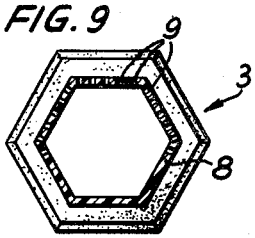
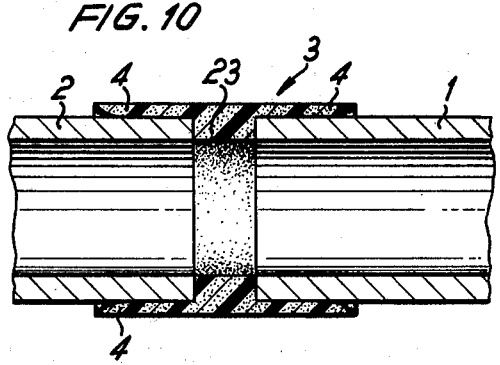
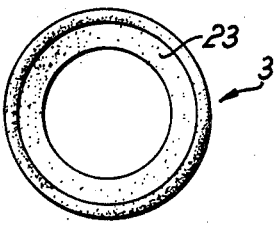
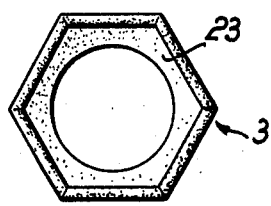
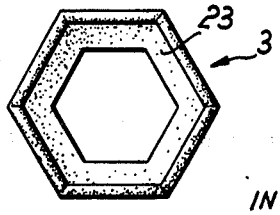

United States Patent Office 3,465,529
Patented Sept. 9, 1969

3,465,529
DOUBLE-ENDED SOCKET COUPLING FOR STONEWARE PIPES
Bernd-Heinz Helle, Paderborn, Germany, assignor to Heinz-Joachim Baar, Oldenburg, Germany
Filed May 31, 1967, Ser. No. 642,565
Claims priority, application Germany, June 2, 1966, H 59,573; July 28, 1966, H 60,083; Aug. 27, 1966, H 60,360
Int. Cl. E02b 11/00; B01d 35/02
U.S. Cl. 61—11                   9 Claims

ABSTRACT OF THE DISCLOSURE

A double-ended socket coupling which connects stoneware pipes to one another is disclosed. The coupling is formed of a pair of extremity sections having a flexible constricted portion therebetween. The intermediate flexible portion is perforated and has a filter located over the perforated portion which serves to filter fluid flowing into the pipes.

---

The present invention relates generally to a double-ended socket coupling for pipes and particularly to a coupling for stoneware pipes for dewatering or filtering purposes.

Stoneware pipes have been employed preponderantly until now for dewatering purposes, that is, for removal of subsurface water and for better aeration of the soil. The subsurface water penetrates into the stoneware pipes through their joints and is ducted by these pipes to the outfall.

In fine-grained soils, such as loam, clay, quicksand, etc., minute soil particles are continually entrained into the stoneware pipes by the subsurface water. Thus, after a few years of use, entire stretches of stoneware pipe become clogged, or the joints of the stoneware pipes become sealed. In order to prevent or inhibit this clogging or sealing action, filtering material is placed around or on the stoneware pipes in such soils. The known filtering materials, such as gravel, slag, peat, heather, glass-fibre, and the like, have substantial disadvantages however because costs are increased by the numerous operations required. Glass wool filters laid in endless manner have proved satisfactory in the case of uninterrupted plastic pipes for dewatering purposes, but these filters cannot be employed in an endless manner with stoneware pipes which must be separately laid in the ground.

Another disadvantage of the separately laid stoneware pipes is that the stoneware pipes are undermined in the said soils and sink, if the water pressure is considerable. In marshy ground, for example, so-called duckboards are laid beneath the stoneware pipes, whereas laying of stoneware pipes in quicksand or drifing sand and the like, has not as yet been possible in a relatively simple manner. The separate pipes become clogged with quicksand during the actual laying operation, and are raised partially. Another disadvantage is that the stoneware pipes cannot be laid in curves, owing to their rigidity, without their joints opening at one side.

In view of these disadvantages, stoneware pipes can be employed in only certain conditions, although their material has proved satisfactory and mitigation of their disadvantages involves considerable additional costs.

It is, therefore, an object of this invention to eliminate the disadvantages of the known devices, and moreover to secure a considerable increase in the durability and service-like of stoneware pipe dewatering ducts. According to the invention, this problem has been resolved by employing a so-called "waisted" flexible intermediate element which is constructed to act as a filter.

Stoneware pipes may now be connected to form a flexible line by means of the double-ended socket couplings according to the invention. By contrast to the plastic dewatering pipes, the uninterrupted line of stoneware pipes do not float upwards, owing to their intrinsic weight. The additional expenses are reduced. The work performed until now to line up the pipes in a ditch is no longer necessary. The inflow openings for subsurface water can be enlarged considerably, so that the soil can be tilled earlier, since the subsurface water is removed more quickly.

By utilizing the double-ended socket coupling comprising a flexible intermediary part and a double filter according to this invention, the dewatering pipes may also be laid in curved form. Clogging or silting is no longer possible due to the operation of the double-ended socket coupling according to this invention.

The advantages and features of this invention are of special importance for soils containing iron oxides or silt. Rusting or silting is inhibited considerably by virtue of the fact that in contrast to plastic dewatering pipes, water entry openings are provided in a double filter preferably no closer than approximately 13 inches to each other. For even more effective action, the double-ended socket coupling and the filter may be impregnated with bactericides to counteract biological contamination. The line of pipes may also be surrounded with coarse limed slag. This substantially prevents rusting, silting and contamination of the pipes. By virtue of the solid connections between the stoneware pipes, the lines of stoneware pipes may be flushed out if required, without the risk of undermining or displacing the pipes.

Stoneware pipes are usually laid by mechanical means at present. They reach the bottom of the ditch or trench along a chute. By utilizing the double-ended socket coupling of this invention the operative placing of the pipes pushes the extremity of each stoneware pipe into firm abutment against the inner step of the double-ended socket coupling.

The greater proportion of subsurface-water almost always seeps up from below, and it is thus possible in one embodiment of the invention to leave the annular base of the middle portion of the double-ended socket coupling solid, that is, unperforated and free of holes over half of its periphery. This portion is turned towards the bottom of the trench. This ensures that the subsurface water seeps into the stoneware pipes laterally or from above. This also considerably inhibits the entrainment of soil particles and substantially reduces the degree of silting up. The internal base of the pipes moreover produces an uninterrupted surface free of friction, so that the subsurface water can drain off without hindrance.

A second filter is preferably inserted into the trough-shaped or box-shaped intermediary part. The filter is in the form of an annular filter and may consist of plastic fibres, plastic sponge of fine-pored structure permeable to water, glass wool fibres, or organic fibres. The ring of plastic sponge of fine-pored structure may, for example, have a slightly smaller internal diameter than the reduced diameter of the intermediary part so that the annular filter may fit tightly.

According to another feature of the invention, the double-ended socket couplings, and accordingly the stoneware pipes, may be of polygonal cross-section. This offers the advantage that the pipes may be laid to bear flat on a wide base. This prevents settling, skewing or twisting of the pipes if they are laid in soils which are of loose consistency or of low carrying capacity. When laying pipes in marshy ground, it is no longer necessary, for example, to employ costly wooden grids.

According to another embodiment of this invention, the double-ended socket coupling may be made wholly of material permeable to water, the tubular sleeve of the coupling having an annular internal web. The material employed for this purpose may be an expanded thermoplastic material or sponge rubber. This arrangement has the further advantage that the filtering action is provided by the actual material of the double-ended socket coupling. Production costs are reduced even further thereby, since the insertion of the annular filter into the double-ended socket coupling becomes unnecessary. It is further advantageous that the filtering portion cannot be damaged easily when the double-ended socket couplings are exposed to mechanical stresses. It is advantageous moreover in this embodiment, that the filtering action occurs not only in the median portion of the double-ended socket coupling, but also over its entire surface since the water can equally penetrate into the stoneware pipes through the socket portions of the surface areas.

The invention will now be described in detail with reference to the accompanying drawings which show preferred embodiments of the invention.

FIG. 1 is a view in elevation of the double-ended socket coupling according to the invention, comprising the intermediate part, and with the filter fitted;

FIGS. 2–4 illustrate different forms of construction of the intermediate part, utilized with the coupling shown in FIG. 1;

FIG. 5 is a longitudinal section taken through the double-ended socket coupling of FIG. 1 with its intermediate part and the filter in position;

FIG. 6 is a cross-section of the double-ended socket coupling of FIG. 1 with the intermediate part partially acting as a filter;

FIGS. 7–9 illustrate a view similar to that of FIG. 1 showing another embodiment of a double-ended socket according to this invention;

FIGS. 8 and 9 are possible cross-sections of the embodiment of FIG. 7 illustrating two typical polygonal configurations of the intermediate part;

FIG. 10 is an elevation of yet another embodiment of a double-ended socket coupling according to this invention; and FIGS. 11–13 illustrate various cross-sectional configurations of the coupling shown in FIG. 10.

Referring now to the drawings, a pair of stoneware pipes 1 and 2 (FIGS. 1–5) are connected to each other by means of the double-ended socket coupling 3. The terminal areas 5 of the reception extremities 4 of the double-ended socket coupling 3 are widened conically. This conical portion, which facilitates the insertion of the extremities of the stoneware pipes into the coupling merges into a cylindrical portion. The extremities of the stoneware pipes are inserted into the coupling 3 until their extreme delimiting surfaces strike the intermediate portion 6 of the coupling.

The intermediate portion 6 consists of a box or trough-shaped constriction. The cross-section of this constriction may be formed in several ways. Several preferred cross-sectional shapes for the intermediate portions are illustrated in FIGS. 2–4.

In FIG. 2 the intermediate portion 6 has annular flanges 7 which extend at right angles from the base 8 of the annulus. The base 8 of the annulus has slots 9 formed therein to allow the passage of water. FIG. 3 illustrates the cross-section of the intermediate portion 6 which is of swallow-tail shape. The annular flanges 10 lean inwards towards the middle. The base of the annulus has circular or oval passage holes 11. The swallow-tail shape of the annular groove is advantageous for securing an inserted filter. The filter is gripped by the annular flanges 10 which converge towards the periphery of the coupling. In the form of the intermediate portion 6 shown in FIG. 4, the annular flanges 12 extend outwardly at equal slopes, diverging towards the periphery of the coupling.

In the embodiments illustrated in FIGS. 2–5, the box-shaped or trough-shaped constriction of the intermediate portion 6 corresponds to the wall thickness of the stoneware pipes 1 and 2. The internal diameter of the intermediate portion 6 of the double-ended socket coupling 3 should not be smaller than the internal diameter of the stoneware pipes to avoid impeding the flow of fluid within the stoneware pipes. The double-ended socket coupling is made of flexible material, for example of rubber or plastic material. Thermoplastic materials, for example those based on styrene, as well as polyethylene, may be employed for this purpose.

The box-shaped or trough-shaped constriction of the intermediate portion 6 receives an annular filter 13 (FIG. 5) which is preferably made in the form of an elastic filter. In the form of construction shown in FIG. 6 only the upper portion of the base 8 of the annulus is provided with water passage openings.

Since the flexibility of the intermediate portion 6 of the double-ended socket coupling 3 should be greater than that of the reception extremities 4 of the coupling, it is desirable for the coupling to be made from a material of varying consistency in such manner that the intermediate portion 6 acquires greater flexibility than the reception extremities 4 of the double-ended socket coupling 3.

In the embodiments of this invention, illustrated in FIGS. 7–9, the stoneware pipes 1 are hexagonal in cross-section, as are the reception extremities 2 of the double-ended socket coupling 3. The delimiting surface 4 forms the base on which the pipes are laid.

In the embodiment of this invention shown in FIG. 8 the internal space of the stoneware pipe is circular in cross-section. Accordingly, the space encircled by the annular base 8 of the intermediate portion 6 of the double-ended socket coupling 3 is also circular. The base 8 of the intermediate portion of the double-ended socket coupling may also be polygonal in cross-section, as illustrated in FIG. 9. In this latter example, the internal space of the stoneware pipes is also polygonal in cross-section.

In the embodiments of this invention illustrated in FIGS. 10–13 the stoneware pipes 1 and 2 are connected to each other by means of a double-ended socket coupling 3 which has an annular internal web 23 in the middle. The double-ended socket coupling is of one-piece construction, made from a material which is permeable to water and preferably flexible. The internal web 23 has a height corresponding to the wall thickness of the stoneware pipes 1 and 2 and is sufficiently wide to provide an appropriate filtering action. The width of web 23 may be chosen at will. The material of the web 23 allows liquid to pass, so that the reception extremities 4, which may also be widened conically in this embodiment of a double-ended socket coupling, already provides a filtering action. FIGS. 11–13 illustrate different cross-sections of coupling 3 and web 23. The polygonal form shown in FIGS. 12 and 13 need not necessarily be hexagonal, and it is understood that a cross-sectional form of either coupling 3 or web 23 may be chosen.

In the embodiments shown, the double-ended socket coupling may be made from an expanded thermoplastic material, rubber, sponge rubber, felt fabrics and the like. It is essential that the material be flexible and permeable to water in order to allow the pipes to be laid in curves.

While only a few embodiments of the present invention have been shown and described, it will be understood that many changes and modifications may be made thereto without departing from the spirit and scope of the invention.

What is claimed is:
1. A double-ended coupling for pipes comprising;
   a pair of flexible extremity sections for engaging the ends of adjacent pipes, a flexible recessed base portion between said extremity sections, said base portion having sufficient depth to solidly engage said ends of adjacent pipes and having a plurality of inlets communicative with the internal passageways of said engaged pipe ends, said base portion being sufficiently flexible to permit angular movement of said adjacent pipe ends, and a filter disposed and retained in said recessed base portion and covering said inlets so as to filter fluids flowing therethrough.

2. A double-ended socket coupling as claimed in claim 1 wherein said flexible recessed base portion comprises a constriction having a rectangular cross-section.

3. A double-ended socket coupling as claimed in claim 1 wherein said flexible recessed base portion includes a constriction having a trapezoidal cross-section.

4. A double-ended socket coupling as claimed in claim 1 wherein said flexible recessed base portion comprises a constriction having a swallow-tail cross-section.

5. A double-ended socket coupling as claimed in claim 1 wherein said flexible recessed base portion comprises a constriction corresponding to the wall thickness of said pipes.

6. A double-ended socket coupling as claimed in claim 1 wherein said base portion is provided with inlet openings which are polygonal in cross-section.

7. A double-ended socket coupling as recited in claim 1, wherein said filter is an elastic filter drawn under initial tension onto said base portion.

8. The double-ended socket coupling as recited in claim 1 wherein the edges of said extremity sections are conically widened to permit easy insertion of the ends of said pipes into said coupling.

9. The double-ended socket coupling as recited in claim 1 wherein said extremity sections are polygonal in cross-section to engage pipe ends having polygonal cross-sections.

References Cited
UNITED STATES PATENTS

| | | | |
|---|---|---|---|
| 417,127 | 12/1889 | Williams | 210—497 X |
| 1,077,132 | 10/1913 | Erickson | 61—12 |
| 1,538,669 | 5/1925 | Smith | 61—10 |
| 1,801,758 | 4/1931 | Sinclair | 61—12 |
| 2,052,020 | 8/1936 | Black | 61—13 |
| 2,116,165 | 5/1938 | Ullman | 61—10 |
| 2,893,212 | 7/1959 | Holicky | 61—11 |
| 3,081,599 | 3/1963 | Roberg | 61—11 |
| 3,103,789 | 9/1963 | McDuff et al. | 61—11 |
| 3,246,920 | 4/1966 | Pall | 210—232 X |
| 3,360,283 | 12/1967 | Guthrie | 285—235 X |

REUBEN FRIEDMAN, Primary Examiner

W. S. BRADBURY, Assistant Examiner

U.S. Cl. X.R.

61—13; 210—170, 459; 285—235